3,184,821
TREATMENT OF FILAMENTARY MATERIAL
Robert W. Singleton, New York, N.Y., and Harry S. Pulaski, Elizabeth, N.J., assignors to Celanese Corporation of America, New York, N.Y., a corporation of Delaware
No Drawing. Filed June 29, 1961, Ser. No. 120,497
18 Claims. (Cl. 28—72)

This invention relates to filamentary material comprising an oxymethylene polymer and to a method for improving the properties of such filamentary material.

It is known that filamentary material may be spun from oxymethylene polymers and that filaments of high tenacity and high crystallinity may be thus obtained. It is an object of this invention to improve other properties and characteristics of such filaments and thereby to broaden the utility thereof. Other objects will appear hereinafter.

In accordance with one aspect of this invention a method is provided for improving filamentary material comprising an oxymethylene polymer which comprises heating said filamentary material to an elevated temperature between about 5 and 45° C. below its crystalline melting point and maintaining said filamentary material at said elevated temperature under sufficient tension to prevent its surface fusion for a period sufficient to increase its crystallite size by at least 5%, and preferably by at least 15%. Under specially controlled conditions, the crystallite size may be increased as much as 300% or more.

At temperatures in the higher portion of said temperature range the filamentary material, if permitted to shrink freely, would fuse at its surface although it is below the crystalline melting point. Such fusion is evidenced by the fact that filaments in contact with each other stick together. By maintaining tension on the filamentary material to reduce or eliminate shrinkage the surface fusion is avoided. In the lower portion of the temperature range the filamentary material may be permitted to shrink freely without danger of surface fusion.

The elevated temperature treatment is usually a dry heat treatment, although treatment with steam under pressure may be used.

The term "dry heat," as used herein, is not intended to exclude the presence of all moisture. It includes heating with ambient air which has had its temperature raised in an oven and other instances where water vapor is present without the concomitant presence of liquid water in equilibrium therewith.

The oxymethylene polymer filamentary material may be prepared from a homopolymer such as may be prepared from formaldehyde or trioxane. Or it may be prepared from a copolymer, such as a copolymer of trioxane with a cyclic ether having adjacent carbon atoms, as disclosed in application Serial No. 63,491, filed by Walling, Brown and Bartz on October 19, 1960, and now Patent No. 3,027,352. The preferred copolymers are those made up of oxymethylene and from about 0.5 to 25 mol percent of oxyethylene groups, and may be prepared by copolymerizing trioxane with a cyclic ether containing oxyethylene groups, such as ethylene oxide or 1,3 dioxolane.

The increase in crystallite size is determined by quantitative X-ray analysis measuring the width at half-height of the diffraction peaks according to the method of Scherrer. A complete description of the method of determining crystallite size may be found in "X-Ray Diffraction Procedures for Polycrystalline and Amorphous Materials" by Alexander and Klug, published by John Wiley & Sons, New York, in 1954. Chapter 9 entitled "Crystallite Size Determination from Line Broadening" (pages 491 to 538) is particularly pertinent and the procedure used follows the example at page 530.

Crystalline melting point is determined by slowly raising the temperature of a sample of the polymer (at about 2–3° per minute) on a hot stage and observing the temperature at which the polymer loses its birefringency. The melting point of oxymethylene homopolymers is generally between about 175° and 180° C. Copolymers run somewhat lower in melting point so that a copolymer containing about 2.5% by weight of ethylene oxide melts at about 165° to 170° C.

The filamentary material is prepared from the homopolymers and copolymers described above, generally by melt spinning, although dry and wet spinning methods may also be used. Usually one or more thermal stabilizers are incorporated into the polymer in order to reduce degradation during spinning.

The proportion of stabilizer incorporated depends upon the specific stabilizer used. A proportion between 0.05 and 10 weight percent (based on the weight of polymer) has been found to be suitable for most stabilizers.

One suitable stabilizer system is a combination of an autioxidant ingredient such as phenolic antioxidant and most suitably a substituted bisphenol, and an ingredient to inhibit chain scission, generally a compound or a polymer containing trivalent nitrogen atoms.

A suitable class of alkylene bisphenols includes compounds having from 1 to 4 carbon atoms in the alkylene group and having from zero to 2 alkyl substituents on each benzene ring, each alkyl substituent having from 1 to 4 carbon atoms. The preferred alkylene bisphenols are 2,2'-methylene bis-(4-methyl-6-tertiary butyl phenol) and 4,4'-butylidene bis-(6-tertiary butyl-3-methyl phenol). Suitable phenolic stabilizers other than alkylene bisphenols include 2,6-ditertiary butyl-4-methyl phenol, octyl phenol and p-phenyl phenol.

Suitable scission inhibitors include carboxylic polyamides, polyurethanes, substituted polyacrylamides, polyvinyl pyrrolidone, hydrazides, compounds having 1 to 6 amide groups, proteins, compounds having amidine groups, cycloaliphatic amine compounds and aliphatic acylureas. Suitable scission inhibitors as well as suitable antioxidants and proportions are disclosed in application Serial No. 826,115, filed by Dolce on July 10, 1959, application S. No. 831,720, filed by Dolce, Berardinelli and Hudgin on August 5, 1959, now Patent No. 3,144,431, application S. No. 838,427, filed by Berardinelli on September 8, 1959 and now abandoned, application S. No. 838, 832, filed by Dolce and Hudgin on September 9, 1959, application Serial No. 841,690, filed by Kray and Dolce on September 23, 1959, and now abandoned, application Serial No. 851,560, filed by Berardinelli, Kray and Dolce on November 9, 1959 and now abandoned, application S. No. 1,457, filed by Dolce and Berardinelli on January 11, 1960, and now Patent No. 3,133,896 and application Serial No. 4,881, filed by Kray and Dolce on January 27, 1960. The disclosures of the above-mentioned applications are incorporated herein by reference.

The stabilizers may be incorporated into the polymer by dissolving both the polymer and the stabilizer in a common solvent and thereafter evaporating the solution to dryness. Alternatively, the stabilizers may be incorporated into the polymer by applying a solution of the stabilizer to finely divided polymer, as in a slurry, and thereafter filtering the polymer and evaporating to dryness. The stabilizer, in finely divided dry state may be blended into finely divided polymer in any suitable blending apparatus.

One suitable method of incorporation of the stabilizers is by blending a dry solid stablizer into the plastic polymer while the latter is being kneaded as on heated rolls or through an extrusion.

Sipping methods and conditions are disclosed in copending application Serial No. 44,543 of Albert G. Williams and in application Serial No. 44,544 of Donald E. Hudgin and Frank M. Berardinelli, both filed July 22, 1960 and both incorporated herein by reference. Methods and conditions for orientation of the filamentary material by drawing are also disclosed in these applications.

The treatment of this invention is suitably applied to filamentary material ranging in denier from about 10 denier monofilament to a tow of several thousand denier and ranging in tenacity from about 4 to about 14 g./d.

In accordance with one aspect of this invention the filamentary material is heated to increase its crystalline order in order to set it in a tortuous configuration for bulk yarn or stretch yarn purposes. A yarn of oxymethylene polymer filamentary material may be bulked, voluminized or texturized by being held in a tortuous configuration, such as a crimped, curled or looped configuration while heat is applied to increase the crystalline order of the polymer and to set the filamentary material in its tortuous configuration. Yarns set in curled configuration have exceptionally rapid and complete recovery as well as high potential stretch and are useful as stretch yarns.

The filamentary material may be crimped by knitting by meshed gears or by a stuffing box in a manner similar to filamentary material of other polymeric materials and is set in crimped configuration by heating the filamentary material while it is held in its crimped configuration to a temperature and for a period which will increase its crystalline order to the desired degree. Similarly the filamentary material may be curled by twist or by false twist or by being pulled across a sharp edge. Curled yarns are set by heating to the desired temperature and for the desired period while the yarn is maintained in curled position. After setting, the yarn is untwisted. Looped yarns are made by feeding a filament yarn to a zone of high air turbulence at a faster rate than it is withdrawn in the manner similar to that used in yarns of other polymeric materials and are set as described above. Usually the temperature of the heat treatment for copolymers will be between about 130° and about 165° C. and the duration of the heat treatment will be between about 30 seconds and about 15 minutes. The preferred treatment is at a temperature between about 150° and about 160° C. for a period between about 1 minute and about 5 minutes.

In accordance with another aspect of this invention the lateral strength of oxymethylene polymer filamentary material is enhanced by heating the material to a temperature and for a period sufficient to increase its crystalline order to the desired extent. The loop tenacity, a measure of the lateral strength of a filament is increased by the use of this invention by between about 25 and 100%. By this invention one may obtain filaments combining high tenacities, in excess of 9 g./d., with loop tenacities in excess of 2 g./d.

Loop tenacity is measured by looping a portion of filament around another portion of the same filament and testing the composite structure in a tensile tester, with the two ends of one filament held by one jaw of the tester, and the two ends of the other filament held by the other jaw. The loops are simply interlocked without being in the form of any knot, and the tension is applied to each filament at the bend of the loop.

The temperature and duration of the heat treatment for increase in lateral strength is similar to that described above.

The loop strength of oxymethylene fibers may be improved by the method of this invention either before or after knitting. By the use of this invention, loop strength is improved by between about 25 and about 100% of its original value.

In accordance with still another aspect of this invention the creep resistance of highly drawn oxymethylene polymer fibers is improved. While oxymethylene polymer fibers may be drawn to excellent tenacities, of the order of about 8 to 14 g./denier, it has been found that the fibers will break when subjected over a long period to a load equivalent to only 50% of their breaking tenacity. Treatment in accordance with this invention will extend the time before breaking when a filament is subjected to 50% of its breaking tenacity.

From another point of view, for a specified level of tenacity, this invention permits the production of fibers of superior creep resistance than may be obtained by directly drawing the fiber to obtain the desired tenacity. The tenacity of the fiber is somewhat lowered by the heat treatment, but this can be compensated for by drawing to a higher tenacity than ultimately required. By this invention one may retain tenacities in excess of 9 g./d. while increasing creep resistance to the point where the extension after 20 hours under a load of 5 g./d. at room temperature is less than 15%.

The usual temperature and duration of the heat treatment for improvement of creep resistance is similar to that described above with reference to the set of bulked yarn.

In accordance with still another aspect of this invention, knitted hosiery may be boarded, or set into the desired shape by being placed over a shaped form and subjected to elevated temperatures to increase the size of the crystallites in the filaments while the hose is maintained in the desired shape.

In the preferred aspect of this embodiment of the invention, the boarding takes place in dry heat in the above disclosed temperature range, most preferably in dry heat at a temperature between about 5° and about 10° C. below the crystalline melting point of the polymer.

Unlike nylon hosiery which requires steam heat for boarding, the oxymethylene polymer hosiery may be boarded in dry heat and therefore makes unnesessary the use of heavy autoclaves for the boarding treatment and the necessity (required by law in many communities) of having a licensed engineer to operate the high pressure equipment.

In the boarding operation, the stockings are placed on a shaped frame and then the frame and stocking are placed in an oven maintained at the desired boarding temperature. The stockings are maintained at this temperature for a period sufficient to increase the crystallite size by at least 5%, generally at least 30 seconds and preferably from about one to five minutes.

Upon completion of the boarding operation, the hosiery is dyed to the desired shade, using disperse dyes, as described in the copending application S. No. 120, 523 filed June 29, 1961, by Bruce B. Allen. Usually dyebath temperatures between about 75° and about 97° C., dyeing times between about 30 minutes and about 2 hours and dyestuff concentrations between about 0.2 and about 1.0 wt. percent, based on the weight of the hosiery are used.

After completion of the dyeing operation, the hosiery is washed and dried and then subjected to a post-boarding operation to remove the wrinkles caused by the dyeing operation. Post boarding conditions can be equal to or milder than the conditions for the original boarding and usually involve temperatures between about 100° and about 165° C. and periods from about 1 to about 10 minutes. However, where the original boarding has been under conditions too mild to completely set the filament the post-boarding conditions should be more severe and within the preferred range of 5–10° C. below the crystalline melting point.

In order to avoid reduction in dyeability, it may be preferred in many cases to use mild pre-boarding conditions and to achieve the final set in the post-boarding operation.

*Example 1*

A copolymer of trioxane and 2.5 weight percent of ethylene oxide having a melt index of 8.5 decigrams per minute (dg./min.), stabilized with 0.5 wt. percent of 2,2'-methylene-bis (4-methyl-6-tertiary butyl phenol) and 0.1 wt. percent of cyanoguanidine was melt spun at a temperature of 190° C. through a jet having 34 ten mill orifices. The spining speed was 142 m./min.

The yarn was drawn over a 1.5" pin at a temperature of 120–130° C. at a draw ratio of 4.47:1 and a take-up speed of 100 m./min. The drawn yarn had a denier of 100, a tenacity of 4.4 g./d. and a 29% breaking elongation.

The above-described yarn was twisted to 50 turns per inch on a Whiten Ring Twister. The twisted yarn was treated on the bobbin at constant length for 15 minutes at 160° C. The twist was then removed by back twisting on the Whiten. The resulting yarn was considerably "bulked" by the process and had approximately three times the apparent diameter of the original yarn.

*Example II*

A copolymer similar to that of Example I except that its melt index was 9.1 dg./min. and stabilized with the same stabilizer system was melt spun as a monofilament at a temperature of 190° C. through a screw spinner at a spinning speed of 265 m./min. to produce a 50 denier monofilament.

A portion of the above-described filament was drawn in a single stage over a heated 12" long shoe, i.e., a metal plate curved sufficiently to provide for continuous contact between the filament and the surface of the plate all along the length of filament, maintained at 130° C. The draw ratio was 8.8/1 and the drawing speed was 15 meters/minute. The filament produced had a tenacity of 10.0 g./d. When subjected to a sustained load of 4 g./d., this filament broke in about 150 hours; at a sustained load of 5 g./d. it broke in 8–26 hours (filament broke during the night).

Another portion of the above-described spun filament was drawn in two stages and then heat treated in accordance with this invention. The first stage draw was over a heated 12" long shoe maintained at 110° C. and was at a draw ratio of 5.8/1 and a draw speed of 40 meters/min. The second draw was over a 12" long shoe maintained at 165° C. and was at a draw ratio of 3.0/1 and a draw speed of 16 meters/min. The filament produced had a tenacity of 12.8 g./d. This yarn was heat treated at 160° C. in air for a period of 10 min. and its tenacity dropped to 9.4 g./d. However, this filament despite its somewhat lower tenacity than the singly drawn yarn described above, was able to withstand a sustained load of 4 g./d. for about 180 hours and a sustained load of 5 g./d. for about 45 hours. The loop tenacity of the heat-treated yarn was increased from 2.0 g./d. to 2.5 g./d. The straight elongation increased from 12.0% to 14.5% and the loop elongation increased from 2% to 4%. The crystallite size increased by about 30%.

*Example III*

A portion of the filament of Example II was drawn over a heated 12" long shoe maintained at 140° C. The draw ratio was 7.61/1 and the draw speed was 150 meters/min. The yarn had a straight tenacity of 8.4 g./d. and a loop tenacity of 1.5 g./d.

A portion of the above-described drawn filament was treated at 160° C. in air for a period of 10 min. Its straight tenacity dropped to 6.3 g./d. but its loop tenacity increased to 2.8 g./d.

Before the heat treatment the filament had a straight elongation of 18.1% and a loop elongation of 2.9%. After heat treatment the straight elongation increased to 38% and the loop elongation increased to 15%. The crystallite size increased by about 30%.

*Example IV*

A portion of the 50 denier monofilament of Example II was drawn over a 12" shoe heated to 140° C. at a draw ratio of 7.61/1 and a draw speed of 150 m./min. The 20 denier monofilament obtained had a tenacity of 8.4 g./d., an elongation of 18.1% and a modulus of 63 g./d.

The monofilament was knitted to ladies' stockings on both full fashion knit machines and seamless circular knit machines. The resulting stockings were pre-boarded at 115° C. for 1 minute. The hosiery was then dyed in the following dye bath:

Dyestuffs _____ 0.5% Celliton Brown 3–RA; 0.2% Eastman Blue BNN (both based on weight of fiber).
Bath additives ____ 0.5 g./l. Igepon T–77 (sodium N-methyl-N-oleyltaurate flake); 0.5 g./l. sodium hexametaphosphate.
Dyeing time _____ 30 minutes.
Temperature _____ 95° C.

The dyed stockings were post-boarded by being placed over a shaped frame and placed in an oven maintained at 160° C. for a period of five minutes.

The stockings were found to fit and perform satisfactorily by wear testers in repeated wearing and removal. There was no "bagging" at the ankle and knees in these stockings, as is usually associated with hosiery which is insufficiently set.

It is to be understood that the foregoing detailed description is given merely by way of illustration and that many variations may be made therein without departing from the spirit of our invention.

Having described our invention what we desire to secure by Letters Patent is:

1. Method of improving filamentary material comprising an oxymethylene polymer which comprises heating said filamentary material to an elevated temperature between about 5° and about 45° C. below the crystalline melting point of the polymer and maintaining said filamentary material at said elevated temperature under sufficient tension to prevent its surface fusion for a period sufficient to increase its crystallite size by at least 5%.

2. The method of claim 1 wherein said filamentary material is maintained at said elevated temperature under sufficient tension to prevent its shrinkage.

3. Method of improving filamentary material comprising an oxymethylene homopolymer which comprises heating said filamentary material to an elevated temperature between about 5° and about 45° C. and below the crystalline melting point of the homopolymer and maintaining said filamentary material at said elevated temperature under sufficient tension to prevent its surface fusion for a period between about 1 minute and about 15 minutes.

4. Method of improving filamentary material comprising an oxymethylene copolymer having successively recurring oxymethylene groups and containing oxyalkylene groups with adjacent carbon atoms which comprises heating said filamentary material to an elevated temperature between about 5° and about 45° C. below the crystalline melting point of the copolymer and maintaining said filamentary material at said elevated temperature under sufficient tension to prevent its surface fusion for a period between about 1 minute and about 15 minutes.

5. Method of improving the loop strength in a fabric knitted of filamentary material comprising an oxymethylene polymer which comprises heating said fabric to an elevated temperature between about 5° and about 45° C. below the crystalline melting point of the polymer and maintaining said filamentary material at said elevated temperature under sufficient tension to prevent its surface fusion for a period sufficient to increase its crystallite size by at least 5%.

6. Method of preparing a knitted fabric of improved loop strength from yarns comprising an oxymethylene polymer which comprises heating said yarns to an elevated temperature between about 5° and about 45° C. below the crystalline melting point of the polymer and maintaining said filamentary material at said elevated temperature under sufficient tension to prevent its surface fusion for a period sufficient to increase its crystallite size by at least 5% and thereafter knitting a fabric from said yarns.

7. Method of preparing filamentary material of excellent creep resistance which comprises heating a filamentary material comprising an oxymethylene polymer and having a tenacity in excess of 8 grams per denier to an elevated temperature between about 5° C. and about 45° C. below the crystalline melting point of the polymer and maintaining said filamentary material at said elevated temperature under sufficient tension to prevent its surface fusion for a period sufficient to increase its crystallite size by at least 5%.

8. Method of preparing filamentary material of excellent creep resistance which comprises drawing a filamentary material comprising an oxymethylene polymer until it has a tenacity between about 8 and about 13 grams per denier, heating said filamentary material to an elevated temperature between about 5° C. and about 45° C. below the crystalline melting point of the polymer and maintaining said filamentary material at said elevated temperature under sufficient tension to prevent its surface fusion for a period between about 1 minute and about 15 minutes.

9. Method of improving a bulked yarn comprising an oxymethylene polymer which comprises heating said yarn to an elevated temperature between about 5° C. and about 45° C. below the crystalling melting point of the polymer and maintaining said filamentary material at said elevated temperature under sufficient tension to prevent its surface fusion for a period sufficient to increase its crystallite size by at least 5%.

10. Method of preparing a bulked yarn which comprises treating the fibers of a yarn comprising an oxymethylene polymer to foreshorten them in the yarn direction while increasing their apparent bulk and thereafter heating said yarns to an elevated temperature between about 5° and 45° C. below the crystalline melting point of the polymer and maintaining said filamentary material at said elevated temperature under sufficient tension to prevent is surface fusion for a period sufficient to increase its crystallite size by at least 5%.

11. The method of claim 10 wherein said fiber treatment comprises a crimping of said fibers.

12. The method of claim 10 wherein said fiber treatment comprises a curling of said fibers.

13. The method of claim 10 wherein said fiber treatment comprises a looping of said fibers.

14. Method of boarding hosiery knitted of oxymethylene polymer filaments which comprises forming said hosiery into a desired shape and subjecting said hosiery while it is maintained in said shape to dry heat at a temperature between about 5° and about 45° C. below the crystalline melting point of the polymer for a period sufficient to increase its crystallite size by at least 5%.

15. The method of claim 14 wherein said heat treatment precedes a dyeing treatment.

16. The method of claim 14 wherein said heat treatment is subsequent to a dyeing treatment.

17. The method of claim 1 wherein said polymer is a copolymer of trioxane and from about 0.5 to 25 mol percent of a cyclic ether having adjacent carbon atoms.

18. The process of claim 1 wherein said filamentary material is kept at constant length during said heating.

References Cited by the Examiner

UNITED STATES PATENTS

| | | | |
|---|---|---|---|
| 2,517,570 | 8/50 | Irons | 264—346 |
| 2,591,861 | 4/52 | Pannaci | 264—346 |
| 2,768,994 | 10/56 | MacDonald | 260—6 |
| 2,854,701 | 10/58 | Rainard | 28—72 |
| 2,912,742 | 11/59 | Choate | 28—81 |
| 2,952,033 | 9/60 | Goodwin | 264—346 |
| 2,952,878 | 9/60 | Swerlick et al. | 260—67 |
| 2,960,751 | 11/60 | Reymes-Cole | 66—185 |
| 3,007,226 | 11/61 | Becker et al. | 28—76 |
| 3,007,227 | 11/61 | Moler | 28—81 |
| 3,021,588 | 2/62 | Bolinger | 28—76 |
| 3,022,565 | 2/62 | Fitzgerald | 28—72 |
| 3,044,145 | 7/62 | Tager et al. | 28—72 |
| 3,089,323 | 5/63 | Javocek | 66—185 |
| 3,091,015 | 5/63 | Zimmerman | 28—72 |
| 3,103,499 | 9/63 | Dolce et al. | 260—67 |

MERVIN STEIN, *Primary Examiner.*

DONALD W. PARKER, *Examiner.*